Figure 1:
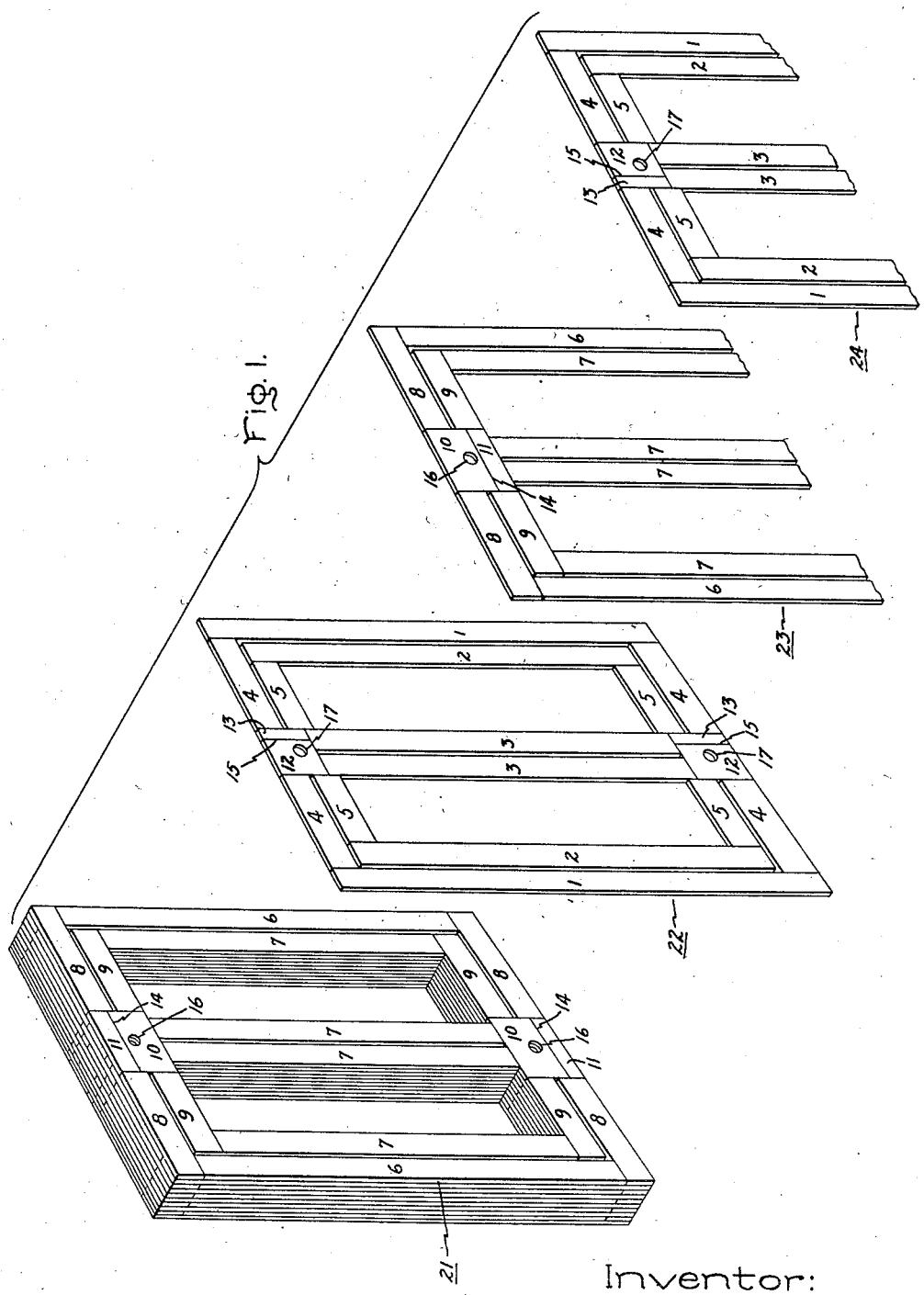

Jan. 28, 1958

T. D. GORDY 2,821,688

THREE PHASE SPLIT LEG AND YOKE TYPE STACKED MAGNETIC CORE SECTION

Filed Sept. 16, 1954

2 Sheets-Sheet 1

Inventor:
Thomas D. Gordy,
by Gilbert P. Tarleton
His Attorney.

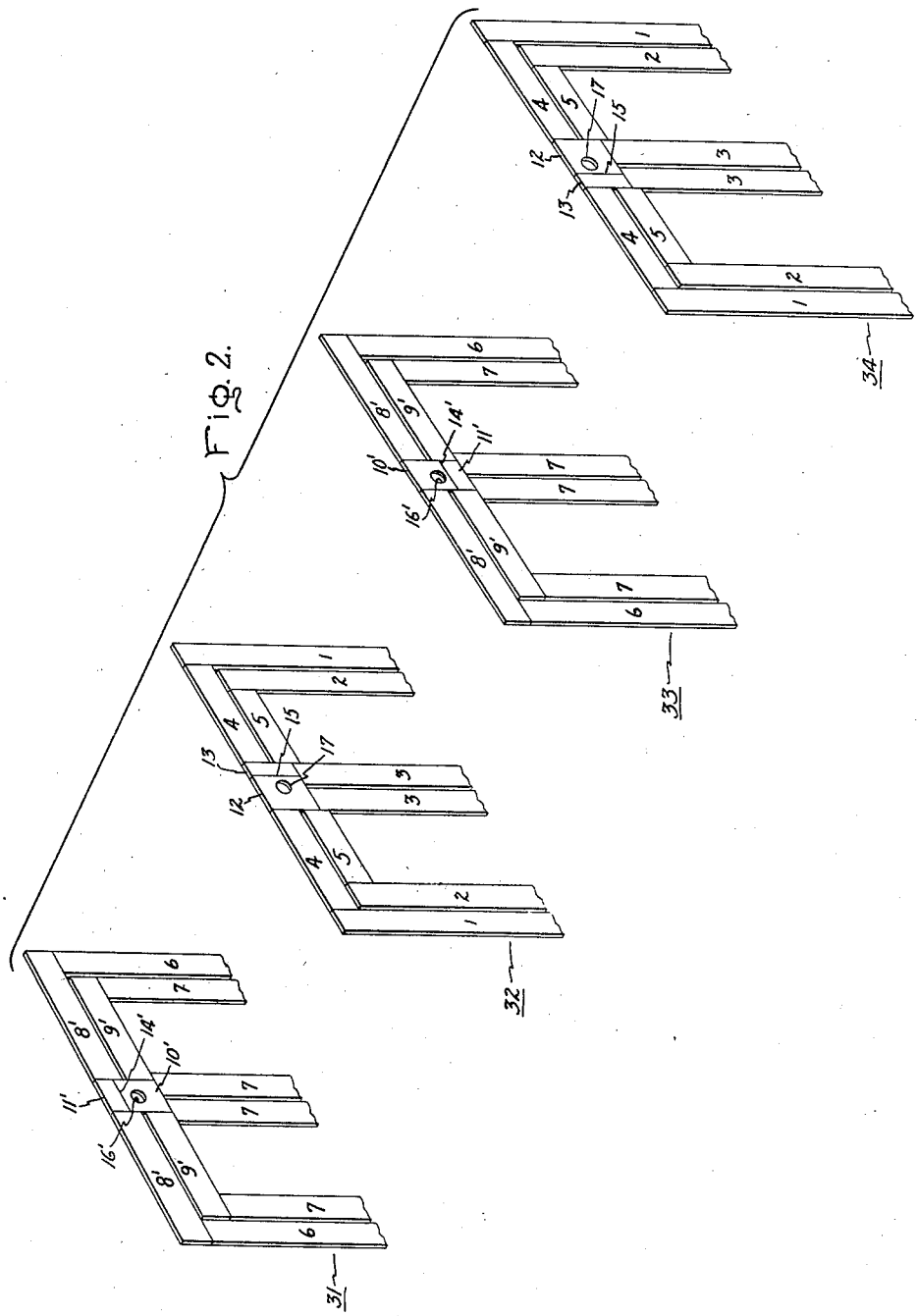

United States Patent Office 2,821,688
Patented Jan. 28, 1958

2,821,688

THREE PHASE SPLIT LEG AND YOKE TYPE STACKED MAGNETIC CORE SECTION

Thomas D. Gordy, Pittsfield, Mass., assignor to General Electric Company, a corporation of New York Application September 16, 1954, Serial No. 456,569

3 Claims. (Cl. 336—5)

This invention relates to a three phase divided or split leg and yoke type stacked magnetic core section, and more particularly, to a three phase three legged divided or split leg and yoke type rectangular-like stacked magnetic plate core section wherein the laminations of each split or divided leg and yoke of each layer are spaced with respect to each other.

One form of three phase divided or split leg and yoke type stacked magnetic core wherein the laminations of each leg and yoke of each layer are spaced with respect to each other is shown in my co-pending patent application Serial No. 274,242, filed February 29, 1952, now Patent 2,698,924 issued January 4, 1955, and assigned to the same assignee as the instant application. Said one form of magnetic core has mitered butt joints between the mating ends of the laminations of each layer and in the T-joint area of each layer by virtue of special T-joint area inserts. A magnetic core having mitered joints requires rather exact cutting and assembly techniques in order to obtain proper mating at the mitered joints and offset between corresponding mitered joints in adjacent layers.

Another form of three phase divided or split leg and yoke type stacked magnetic core wherein the laminations of each leg and yoke of each layer are spaced with respect to each other is shown in copending Somerville patent application Serial No. 290,280, filed May 27, 1952, now Patent 2,812,505, issued November 5, 1957, and assigned to the same assignee as the instant application. Said another form of magnetic core has non-mitered joints between the mating ends of the laminations of each layer and in the T-joint area of each layer by virtue of special T-joint area inserts or notches formed in the outermost lengthwise edges of the central leg laminations of the layers. In said another form of magnetic core the corresponding non-mitered joints of adjacent layers are offset with respect to each other by longitudinally staggering adjacent layers with respect to each other, by varying the width of the special T-joint area inserts and by varying the depth of the T-joint area notches. Said another form of magnetic core likewise requires rather exact cutting and assembly techniques to obtain proper mating at the non-mitered butt joints and offset between corresponding non-mitered butt joints in adjacent layers.

In my invention I utilize non-mitered joints and special T-joint area inserts but am able to obtain offset between corresponding non-mitered joints in adjacent layers without longitudinal staggering of adjacent layers or notching of the outermost lengthwise edges of the central leg laminations of adjacent layers whereby less exact cutting and assembly techniques are required to practice my invention.

In both said one and another forms of magnetic core and in my invention the grain structure of the leg and yoke laminations is oriented in a lengthwise direction by cold rolling. Also, as in said one and another forms of magnetic core, in my invention the laminations of each split or divided leg and yoke of each layer are spaced with respect to each other. Splitting or dividing the legs and yokes provides the advantage of prohibiting the magnetic flux from traveling crosswise or transverse to the lengthwise grain orientation of the legs and yokes. However, spacing the laminations of the split or divided legs and yokes by an air gap prohibits such crosswise travel of the magnetic flux to a much greater degree. An additional advantage of the split or divided leg and yoke type construction in three phase stacked magnetic cores is that cumbersome large width magnetic plate stock need not be used. That is, the split or divided leg and yoke type construction permits use of narrower width magnetic plate stock which can be cut, assembled, and handled much easier than large width magnetic plate stock. Additionally, since large cores having relatively wide legs and yokes can be made from narrow width magnetic plate stock by using the split or divided leg and yoke type construction inventory costs entailed in the manufacture of magnetic cores of widely different sizes can be reduced. Splitting or dividing of the legs and yokes also facilitates end sheeting, particularly in the large size cores, since it requires more care and force to insert a wide yoke lamination than it does to successively insert two narrow yoke laminations between the ends of the leg laminations.

In said heretofore mentioned another form of magnetic core the necessity for using and stocking large width magnetic plate stock is not entirely avoided since the special T-joint area inserts thereof are single piece inserts having relatively large dimensions. In my invention I provide special T-joint area two piece inserts whereby it is entirely unnecessary to use and stock large width magnetic plate stock in the practice of my invention. Also, the various parts of my invention are so arranged whereby each corresponding piece of my special T-joint area two piece inserts can be cut from a single narrow width magnetic plate stock while still providing T-joint area insert grain orientation in two mutually perpendicular directions.

The features of my invention which I believe to be novel are set forth with particularlity in the appended claims. My invention itself, however, both as to its organization and method of operation, together with further objects and advantages thereof, may best be understood by reference to the following description taken in connection with the accompanying drawings.

In the drawings, Fig. 1 is an exploded perspective view of one form of my invention. Fig. 2 is an exploded perspective view of another form of my invention. Like reference numerals will be used throughout Figs. 1 and 2 to indicate similar parts.

Referring now to the drawings, and more particularly to Fig. 1, shown therein is a three-phase three legged divided or split leg and yoke type rectangular-like stacked magnetic plate core section wherein the laminations of each split or divided leg and yoke portion of each layer are spaced with respect to each other. The three uppermost layers 22 to 24 have been removed from the core section proper to better illustrate the construction of the core section. In this form of my invention the core section is built up out of four slightly different layers 21 to 24, however it will be obvious that all of said four layers need not necessarily be used to construct the core section. All the layers of the core section have identical rectangular external outlines and are superposed with respect to each other whereby the external rectangular edges thereof are immediately superposed and aligned with respect to each other. The layer 21 comprises three parallel leg portions which are interconnected at their ends by two special T-joint area inserts and four yoke portions. The two outermost leg portions of layer 21 each comprise two elongated spaced laminations 6 and 7, and the central leg portion of layer 21 comprises two spaced elongated laminations 7 and 7. The central leg portion 7, 7 is abutted at the opposite end edges thereof by two rectangular inserts each of which comprises two rectangular laminations 10 and 11 which abut each other along a lengthwise edge thereof. The rectangular inserts 10, 11 abut the opposite end edges of central leg portion 7, 7 along a lengthwise edge of the inserts 10, 11. All of the end edges of the inserts 10, 11 are abutted by the end edges of four yoke portions each of which comprises two elongated laminations 8 and 9. The yoke portions 8, 9 extend from the inserts 10, 11 to the two outermost leg portions 6, 7 and abut all of the end edges of the two outermost leg portions 6, 7 along the lengthwise edges of the yoke portions 8, 9 adjacent the ends thereof remote from the inserts 10, 11. It will be noted that the laminations 8 and 9 of the yoke portions make square corners with the laminations 6 and 7 respectively of the two outermost leg portions.

The T-joint area inserts 10, 11 have the grains thereof oriented in a lengthwise direction extending parallel to the lines 14. The outermost lengthwise edges of the inserts 10, 11 are coincidental with the outermost lengthwise edges of the yoke portions 8, 9. The opposite end edges of the inserts 10, 11 extending perpendicular to the lines 14 are offset or staggered with respect to the outermost lengthwise edges of the central leg portion 7, 7. That is, the opposite end edges of the inserts 10, 11 extend an equal distance beyond the opposite lengthwise edges of the central leg portion 7, 7 whereby the opposite end edges of the inserts 10, 11 are non-coincidental with respect to the outermost lengthwise edges of the central leg portion 7, 7.

In each layer of the core section the combined width of the two piece T-joint area inserts is equal to the width of the three leg portions and four yoke portions. Thus, in layer 21 each of the elongated laminations of the three leg portions and four yoke portions thereof have an equal width, and the two laminations comprising each of the leg portions and yoke portions are spaced with respect to each other by an equal distance. In layer 21 the combined width of the two laminations and air gap therebetween of each leg and yoke portion is equal to the combined width of the two-piece insert 10, 11. In layer 21 upper insert 10, 11 is identical to the lower insert 10, 11 and has been reversed with respect thereto. Each of the inserts comprises a rectangular lamination 10 and another rectangular lamination 11. The laminations 10 and 11 have equal lengths and unequal widths and abut each other along one of the lengthwise edges thereof as indicated by the line 14. Each of the inserts has an aperture 16 formed in the lamination 10 thereof at a point corresponding to the exact center of the insert. The inserts 10, 11 of the layer 21 have a length greater than the width thereof.

The next layer 22 comprises a central leg portion 3, 3; two outer leg portions 1, 2; four yoke portions 4, 5; and two inserts 12, 13. The inserts 12, 13 have their grains oriented in a lengthwise direction extending parallel to the lines 15. The opposite end edges of the central leg portions 3, 3 are abutted by one of the end edges of the two inserts 12, 13. The end edges of the yoke portions 4, 5 remote from the insert 12, 13 abut the lengthwise edges of the two outermost leg portions 1, 2 adjacent opposite ends thereof and the remote abutting ends of the yoke laminations 4 and 5 make square corners with the abutting ends of the two outermost leg portion laminations 1 and 2 respectively. The end edges of the yoke portions 4, 5 adjacent to the inserts abut the opposite lengthwise edges of the inserts and opposite lengthwise edges of the central leg portions 3, 3 adjacent opposite ends thereof. As in layer 21, in layer 22 the combined width of the yoke and leg portions and inserts are equal. However, in layer 22 the length of the inserts is less than the width of the inserts and the width of the leg and yoke portions. The two outermost lengthwise edges of the inserts 12, 13 are coincidental with the two outermost lengthwise edges of the central leg portion 3, 3. The outermost end edges of the inserts 12, 13 which do not abut the end edges of the central leg portions 3, 3 are coincidental with the outermost lengthwise edges of the yoke portions 4, 5. That is, the end edges of the inserts 12, 13 remote from the end edges of the central leg portions 3, 3 are coincidental with the upper and lower outermost edges of the rectangular-like layer 22. The end edges of the inserts 12, 13 which abut the end edges of the central leg portions 3, 3 are non-coincidental with respect to the innermost outer lengthwise edges of the yoke portions 4, 5. That is, the end edges of the inserts 12, 13 which abut the end edges of the central leg portion 3, 3 are disposed outwardly of the upper and lower window opening edges of the layer 22.

The inserts of the layer 22 each comprise two rectangular laminations 12 and 13. The laminations 12 and 13 have equal lengths and unequal widths and abut each other along one of the lengthwise edges thereof as indicated by the line 15. Each of the inserts of layer 22 has an aperture 17 formed in the lamination 12 thereof whereby the layer 22 is superposed with respect to the layer 21 the apertures 17 will be aligned with respect to the apertures 16 of layer 21. The insert laminations 11 of layer 21 have a width equal to the insert laminations 13 of layer 22, and the insert laminations 10 of layer 21 have a width equal to the insert laminations 12 of layer 22. Since the inserts 10, 11 and 12, 13 are two-piece inserts, it is unnecessary in the practice of my invention to stock large width magnetic plate stock. Furthermore, inasmuch as the width of laminations 11 and 13 are equal and the width of laminations 10 and 12 are equal, the two-piece insert 10, 11 and 12, 13 can be conveniently constructed out of two narrow width magnetic plate strips having the grains thereof oriented in a lengthwise direction.

The next layer 23, it will be noted is identical to the layer 21 except that in the layer 23 the upper insert 10, 11 thereof is reversed with respect to the upper insert 10, 11 of the layer 21. The not shown lower end of the layer 23 will be identical to the lower end of the layer 21 except that the not shown lower insert 10, 11 of layer 23 will be reversed with respect to the lower insert 10, 11 of layer 21. The layer 24 is identical to the layer 22 except that the inserts 12, 13 of the layer 24 are reversed with respect to the inserts 12, 13 of the layer 22.

It is to be noted that all of the laminations 1 to 9 have equal widths and all of the leg and yoke portion laminations having an identical reference numeral have equal lengths. Accordingly, all of the leg and yoke portion laminations can be constructed out of a single narrow width magnetic strip having the grains thereof oriented in a lengthwise direction and care need be exercised only to insure that said strip is cut into nine predetermined different lengths. As heretofore mentioned, the insert laminations 11 and 13 are cut from another strip, and the insert laminations 10 and 12 are cut from still another strip. Inasmuch as the insert laminations 10 and 11 have equal lengths, and the insert laminations 12 and 13 have equal lengths, only two different length dimensions are required in cutting the insert laminations 10—13. Accordingly, the whole magnetic core section can be constructed merely out of three different width strips and eleven different length dimensions. The whole magnetic core section requires only thirteen different laminations, namely laminations 1 to 13. The parts are so arranged whereby in every two immediately adjacent layers the various butt joints in one of said two immediately adjacent layers are offset with respect to the various butt joints in the other of said two immediately adjacent layers. Additionally, in each immediately two adjacent layers, the T-joint area inserts of one of said two immediately adjacent layers have the grains thereof oriented in a direction normal to the grain orientation of the inserts of the other of said two immediately adjacent layers. The superposed inserts 10, 11 and 12, 13 at the upper end of the central leg of the magnetic core section are interleaved with the laminations of the central leg and the laminations of the upper yokes, and the superposed inserts 10, 11 and 12, 13 at the lower end of the central leg of the magnetic core section are interleaved with the laminations of the central leg and the lower yokes. As will be obvious to those skilled in the art, the aligned apertures 16 and 17 adjacent the upper and lower end of the central leg of the magnetic core section are adapted to have bolts pass therethrough whereby clamping plates can be clamped to opposite sides of the magnetic core section to hold the various laminations of the magnetic core section together.

Referring now to Fig. 2 of the drawings, shown therein is another form of my invention. The first layer 31 is identical to the first layer 21 of the first form of invention except with respect to certain differences to be pointed out hereinafter. In layer 31, the central leg portion 7, 7 and the two outermost leg portions 6, 7 are identical to the three leg portions of the heretofore described layer 21. The inserts 10' and 11' of the layer 31 are similar to the inserts 10, 11, of the layer 21 except that the inserts of layer 31 are shorter than the length of the inserts of the layer 21. The length of the inserts 10', 11' is less than the width thereof and the width of the central leg portion 7, 7. Accordingly, the yoke portions 8', 9' of layer 31 are slightly longer than the yoke portions 8, 9 of layer 21 and besides abutting the opposite end edges of the insert 10', 11' they also abut the end edges of central leg 7, 7 along the inner outermost lengthwise edges thereof adjacent to the insert. The second layer 32 of my second form of invention is exactly the same as the second layer 22 of my first form of invention. The inserts 10', 11' of layer 31 and the inserts 12, 13 of layer 32 have their grains oriented in the lengthwise direction of said inserts parallel to the lines 14' and 15 respectively. The inserts 10', 11' may be assigned the same length as the inserts 12, 13. When this is done, the laminations of my second form of invention have only ten different lengths as contrasted to the eleven different lengths of the first form of invention. The third layer 33 is the same as the first layer 31 except that the inserts of the layer 33 are reversed with respect to the inserts of the layer 31. The fourth layer 34 is exactly the same as the fourth layer 24 of the first form of my invention. Additionally, it is to be noted that in Fig. 2 the fourth layer 34 in reality is the second layer 32 reversed. Likewise in Fig. 1 the fourth layer 24 is the second layer 22 reversed. As in the first form of invention, in the second form of my invention the superposed two-piece inserts 10', 11' and 12, 13 are interleaved with the laminations of the central leg and yokes of the magnetic core section, and the aligned apertures 16' and 17 are adapted to have bolts passed therethrough for the purpose of clamping plates against opposite sides of the magnetic core section. In the first form of my invention, inasmuch as the inserts 10, 11 protrude beyond the outermost lengthwise edges of the central leg portions 7, 7; after preformed electrical winding cylinders are assembled about the legs of the core if it is at some time necessary to remove said preformed electrical winding cylinders, the insert 10, 11 at the upper end of the core may have to be removed as well as the upper yokes of the magnetic core. However, in the second form of my invention, inasmuch as the lengths of the insert 10', 11' are less than the widths thereof and do not protrude beyond the outermost lengthwise edges of the central leg portions 7, 7 the electric winding cylinders assembled with the legs of the magnetic core section of my second form of invention can be removed merely by removing the upper yokes without disturbing the superposed T-joint area inserts located at the upper end of the central leg of the magnetic core section.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In a three phase laminated magnetic core comprising a plurality of rectangular shaped flat stacked layers, each of said layers having three parallel spaced legs and four yokes which extend from the ends of the outer legs toward the ends of the central leg to define a pair of rectangular shaped window openings, the corresponding edges of all of said layers and their window openings being aligned with each other, all of said legs and yokes being grain oriented and split and separated in their lengthwise direction into spaced strips of equal width, a pair of rectangular shaped inserts in each layer for joining said four yokes and central leg, said inserts being grain oriented and split but unseparated in their lengthwise direction, all of said legs, yokes and inserts having equal overall widths, all of the inserts having lengths which are different from said overall widths, the inserts at corresponding ends of the central legs of adjacent layers being aligned in their lengthwise direction alternately with the lengthwise direction of the yokes and central legs, the yokes and outer legs of the layers meeting each other at joints which are aligned with the lengthwise direction of said legs and yokes and in offset relationship in corresponding corners of adjacent layers.

2. In a core as in claim 1, wherein the lengths of the inserts in adjacent layers are alternately greater than and less than their overall widths, all of the inserts of alternate layers being identical in construction, and the inserts within layers as well as the corresponding inserts of alternate layers being reversed with respect to each other.

3. In a core as in claim 1, wherein each insert has a length which is less than its overall width, all of the inserts of alternate layers being identical in construction, and the inserts within layers as well as the corresponding inserts of alternate layers being reversed with respect to each other.

References Cited in the file of this patent

UNITED STATES PATENTS

| | | |
|---|---|---|
| 2,456,460 | Somerville | Dec. 14, 1948 |
| 2,560,003 | Sealey | July 10, 1951 |
| 2,698,924 | Gordy | Jan. 4, 1955 |